(12) United States Patent
Gross et al.

(10) Patent No.: US 11,519,476 B2
(45) Date of Patent: Dec. 6, 2022

(54) VIBRATION DAMPER FOR A VEHICLE

(71) Applicant: Bayerische Motoren Werke Aktiengesellschaft, Munich (DE)

(72) Inventors: Dietmar Gross, Weichs (DE); Johannes Maier, Poing (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/965,455

(22) PCT Filed: Jan. 28, 2019

(86) PCT No.: PCT/EP2019/052022
§ 371 (c)(1),
(2) Date: Jul. 28, 2020

(87) PCT Pub. No.: WO2019/145547
PCT Pub. Date: Aug. 1, 2019

(65) Prior Publication Data
US 2021/0054901 A1    Feb. 25, 2021

(30) Foreign Application Priority Data
Jan. 29, 2018   (DE) ............... 10 2018 201 297.0

(51) Int. Cl.
*F16F 9/48* (2006.01)
*F16F 9/18* (2006.01)
*F16F 9/50* (2006.01)

(52) U.S. Cl.
CPC ............ *F16F 9/48* (2013.01); *F16F 9/18* (2013.01); *F16F 9/50* (2013.01); *F16F 2228/04* (2013.01)

(58) Field of Classification Search
CPC ........ F16F 9/48; F16F 9/50; F16F 9/18; F16F 2228/04
See application file for complete search history.

(56) References Cited

U.S. PATENT DOCUMENTS 3,175,645 A * 3/1965 Schafer .................. F16F 9/49
                                                                188/282.6
4,635,909 A    1/1987 Gold
(Continued)

FOREIGN PATENT DOCUMENTS

CN    1628223 A    6/2005
CN    103591207 A    2/2014
(Continued)

OTHER PUBLICATIONS

Chinese-language Office Action issued in Chinese Application No. 201980008328.9 dated May 6, 2021 with English translation (14 pages).

(Continued)

*Primary Examiner* — Vishal R Sahni
(74) *Attorney, Agent, or Firm* — Crowell & Moring LLP

(57) ABSTRACT

A vibration damper for a vehicle, includes at least one cylinder tube forming a fluid chamber, in which a piston assembly is axially and slidingly arranged and divides the cylinder tube into two working chambers, an upper and a lower working chamber, and wherein the piston assembly has an axially moveable main piston which is axially fixed to a piston rod that can move axially relative to the cylinder tube, and which has a piston valve influencing the fluid flow between the upper and lower working chambers, and wherein a further stroke-dependent piston is arranged on an axial extension of the piston rod in the direction of the cylinder base, which operates once a determined damper stroke is achieved. The stroke-dependent piston has a smaller diameter than the main piston and only operates when plunging into a smaller diameter of an inner casing surface. The stroke-dependent piston therefore has a stroke-dependent valve, and the stroke-dependent piston also has a (Continued)

frequency-dependent valve in addition to the stroke-dependent valve.

8 Claims, 2 Drawing Sheets

(56) References Cited

U.S. PATENT DOCUMENTS

| | | | | |
|---|---|---|---|---|
| 5,157,806 | A * | 10/1992 | Wartian | E05F 3/02 |
| | | | | 16/49 |
| 6,446,771 | B1 | 9/2002 | Sintorn et al. | |
| 10,107,352 | B2 * | 10/2018 | Grzesik | F16F 9/3482 |
| 10,865,597 | B2 * | 12/2020 | Chen | F16F 13/007 |
| 2002/0053493 | A1 * | 5/2002 | Sintorn | F16F 9/064 |
| | | | | 188/282.9 |
| 2005/0045440 | A1 * | 3/2005 | Kock | F16F 9/512 |
| | | | | 188/322.15 |
| 2005/0454401 | | 3/2005 | Kock et al. | |
| 2011/0017558 | A1 * | 1/2011 | Nygren | F16F 9/3481 |
| | | | | 188/284 |
| 2012/0061194 | A1 * | 3/2012 | Yu | F16F 9/483 |
| | | | | 188/288 |
| 2014/0048366 | A1 | 2/2014 | Lee et al. | |
| 2014/0252735 | A1 | 9/2014 | Yamashita et al. | |
| 2017/0314636 | A1 * | 11/2017 | Grzesik | F16F 9/3482 |
| 2019/0001783 | A1 * | 1/2019 | Garcia | F16F 9/3235 |
| 2019/0211897 | A1 | 7/2019 | Schneider et al. | |

FOREIGN PATENT DOCUMENTS

| | | |
|---|---|---|
| DE | 602 10 652 T2 | 8/2006 |
| DE | 699 30 708 T2 | 1/2007 |
| DE | 11 2012 004 968 T5 | 8/2014 |
| EP | 0 160 275 A2 | 11/1985 |
| EP | 2 738 417 A2 | 6/2014 |
| EP | 2 952 775 A2 | 12/2015 |
| EP | 3 239 556 A1 | 11/2017 |
| JP | 7-233842 A | 9/1995 |
| WO | WO 03/040586 A1 | 5/2003 |
| WO | WO 2017/202647 A1 | 11/2017 |

OTHER PUBLICATIONS

International Search Report (PCT/ISA/210) issued in PCT Application No. PCT/EP2019/052022 dated Apr. 25, 2019 with English translation (four (4) pages).

German-language Written Opinion (PCT/ISA/237) issued in PCT Application No. PCT/EP2019/052022 dated Apr. 25, 2019 (five (5) pages).

German-language Office Action issued in German Application No. 10 2018 201 297.0 dated Oct. 1, 2018 (five (5) pages).

Chinese Office Action issued in Chinese application No. 201980008328.9 dated Dec. 20, 2021, with English translation (Fifteen (15) pages).

* cited by examiner

VIBRATION DAMPER FOR A VEHICLE

BACKGROUND AND SUMMARY OF THE INVENTION

The invention relates to a vibration damper for a vehicle. In terms of the prior art, reference is made in an exemplary manner to EP 2 952 775 A2 and to DE 602 10 652 T2.

Vibration dampers, also referred to as shock absorbers, for vehicles are known in the most diverse variants in the prior art. Shock absorbers represent a safety-relevant component which is capable of damping the vibrations of the sprung masses, which is why said shock absorbers are also referred to as vibration dampers. Vibration dampers between the axle and the bodywork are necessary since the bodywork spring and the tire spring, conjointly with the associated masses, form a vibration-capable system having two inherent frequencies for the bodywork mass and the wheel mass. Said masses are often also referred to as the sprung mass (bodywork) and the unsprung mass (wheel or axle, respectively). Since the typical excitation by roads is in a wide bandwidth, said inherent frequencies have to be damped.

Hydraulic-mechanical damping has prevailed in the automotive industry today, particularly in the construction mode of the so-called telescopic shock absorber since the latter due to the very small dimensions thereof, the low friction, the precise damping, and the simple construction, mode represents the optimum.

Hydraulic shock absorbers are composed substantially of an oil-filled cylinder and a piston rod guided therein, the piston rod having a piston. In the axial movement of the piston rod (and thus of the piston) in relation to the cylinder, the oil has to flow through tight ducts and valves in the piston. On account of the resistance which acts against the oil herein, pressure differentials, which by way of active surfaces generate the damping forces, are generated.

In telescopic dampers of this type, two different types are to be differentiated, specifically so-called twin-tube dampers and so-called single-tube dampers.

The single-tube damper is subdivided into a working chamber (oil chamber) and a counterpressure chamber (gas chamber). The actual damping work is performed in the oil chamber, that is to say that the damping valves sitting on the piston put up a resistance to the oil flowing through the piston. A pressure differential which puts up a damping force counter to the piston rod moving relative to the containment is generated. The gas chamber compensates volumetric variations in the retraction and deployment of the piston rods and on account of temperature variations.

The twin-tube damper, besides a cylinder tube in which the piston which is fastened to the piston rod and is equipped with further valve parts moves axially, comprises a further containment tube which is coaxially disposed. The piston divides the internal oil chamber into an upper working chamber and a lower working chamber. The piston rod is retracted in the compression stage, and part of the oil flows out from the lower working chamber by way of the piston valve into the upper working chamber. The volume of oil corresponding to the plunging piston rod herein is pushed through a base valve into the so-called compensation chamber between the cylinder tube and the containment tube, said base valve being located at the lower end of the cylinder tube. A pressure differential which is relevant to the damping action is likewise generated herein by the base valve. When the piston rod is deployed (tension stage), the piston valve handles damping, while the volume of oil corresponding to the deploying piston rod flows back in a largely unimpeded manner through the base valve.

A difference is furthermore made between controlled and passive systems in shock absorbers. In the case of controlled shock absorbers, the valves are actively electronically actuated. This enables the damping property to be set as a function of the situation and the desired operating point. However, to this end a complex construction having an additional actuator and wiring is necessary. This causes additional costs as well as additional weight and installation space.

In contrast, passive shock absorbers respond to vibrations or excitations, respectively, from the vehicle or from the carriageway, respectively, without the intervention of additional actuators. This has the disadvantage that the passive shock absorbers cannot be set according to the situation, as is the case in the controlled systems. On the other hand, the passive systems do not necessitate any additional actuators or wiring which is why said passive systems have significant advantages in terms of complexity, installation space and costs in comparison to the active systems.

However, passive shock absorber systems which are configured in such a manner that they can be operated as a function of specific movement variables are also known from the prior art.

For example, from DE 602 10 652 T2 it is known for a damper to be enhanced with a frequency-dependent or frequency-selective valve, respectively. The frequency-dependent or frequency-selective valve, respectively, enables frequency-dependent damping of the vibrations.

A system which can vary the damping effect of the shock absorber as a function of the stroke of the piston is furthermore known from EP 2 952 775 A2.

It is an object of the invention to provide an improved vibration damper of a vehicle.

The object is achieved by a vibration damper for a vehicle according to the claimed invention.

Proposed is a vibration damper, (hereunder also referred to as a shock absorber) for a vehicle, said vibration damper comprising at least one cylinder tube which forms a fluid chamber and in which a piston assembly is disposed so as to slide axially. A telescopic shock absorber, in particular a twin-tube shock absorber, as explained in the prior art is proposed herein. The piston assembly, or a piston of such a piston assembly, respectively, herein divides the cylinder tube into an upper working chamber and into a lower working chamber which can be filled with fluid.

The piston assembly in turn herein comprises a piston rod which is disposed so as to be coaxial with the cylinder tube and is movable axially to the latter, and on which a piston (hereunder also referred to as the primary piston) is coaxially disposed. The piston herein is disposed so as to be displaceable axially in the cylinder tube by way of the piston rod. The piston comprises at least one piston valve by means of which a flow of fluid between the upper working chamber and the lower working chamber is enabled. A suitable cross-sectional reduction or increase, respectively, of these passage holes herein enables the damping function.

The cylinder tube in the installed state in the vehicle is usually a component which is at least approximately aligned in the vehicle vertical direction (wherein the cylinder longitudinal axis is at least approximately aligned in the vehicle vertical direction), which is why an upper working chamber is considered to be that working chamber which, when viewed in the vehicle vertical direction, is above the piston, and a lower working chamber is considered to be that working chamber which, when viewed in the vehicle vertical direction, is located below the piston.

Furthermore provided is an extension of the piston rod in the direction of the cylinder tube base, or the cylinder base, respectively, the extension running beyond the primary piston, a further, stroke-dependent piston being coaxially disposed on the extension. The diameter (thus the external diameter) of the stroke-dependent piston herein is smaller than the diameter of the primary piston, or of the internal shell face of the cylinder tube, respectively. The stroke-dependent piston serves for achieving additional damping, the latter however acting only upon reaching a specific damper stroke, or a specific axial plunging depth of the stroke-dependent piston in the direction of the cylinder tube base, respectively.

The action of this damping, or of the stroke-dependent piston, respectively, herein takes place as a function of the stroke, specifically as from that plunging depth of the stroke-dependent piston into the cylinder tube, from which the diameter of an internal shell face corresponds to the external diameter of the stroke-dependent piston.

Depending on the height in the cylinder tube from which a smaller diameter of this type of an internal shell face is chosen (thus the mentioned plunging depth), other damping takes place, specifically such damping which is determined by the stroke-dependent piston. In other words, this means that other damping, in particular a higher damper effect, takes place as from a specific stroke of the piston or of the shock absorber, respectively.

A stroke-dependent valve is formed on account thereof.

It is furthermore provided that the stroke-dependent piston, besides a stroke-dependent valve, comprises a frequency-dependent valve.

In the context of this invention a frequency-dependent valve, or a frequency-selective valve, respectively, is understood to be a valve which is able to vary the damping force of the vibration damper as a function of the excitation frequency of the valve. This variation herein takes place without external adjustment but merely on account of the presence of such a frequency-dependent valve.

This differs from known valves (for example piston valves or base valves, respectively) of a vibration damper which supply different damping forces only as a function of speed; that is to say that if only the stroke is varied in such a conventional valve (for example a piston valve or a base valve, respectively, at a constant speed, the damping force is not varied. However, if the stroke in a frequency-dependent valve according to the invention is varied at constant speed, the damping force is also varied. Conversely, the damping force in the use of a frequency-dependent valve is also varied at a constant stroke and a varied speed.

A configuration of this type enables that the shock absorber can be in each case operated in a stage (thus the compression stage and the tension stage) as a function of additional movement variables of the vehicle. Besides a stroke-dependent damping force in a compression stage, additional frequency-dependent damping in a tension stage can thus be implemented, both two types of damping in turn being able to be carried out by means of a common component. In comparison to already existing shock absorber embodiments this has in particular the advantage that frequency-dependent and stroke-dependent damping can in each case be implemented in a stage of damping by way of a single component without a comparatively large additional investment or requirement in terms of installation space.

A vibration damper which can be operated as a function of a plurality of movement variables of the vehicle or of the environment, respectively, and which in a stage of damping can dampen differently as a function of the vibration frequency as well as of the stroke of the piston and simultaneously does not have any additional investment in terms of complexity or installation space in comparison to the known shock absorber embodiments which in one stage can dampen only in a frequency-dependent or frequency-selective manner, respectively, or a stroke-dependent manner, is thus specified.

It is preferably provided herein that the frequency-dependent valve, or the piston thereof in which the valve is integrated, respectively, is disposed to as to be coaxial with the stroke-dependent piston and is at least in part enclosed by the stroke-dependent piston. The frequency-dependent valve and the stroke-dependent piston particularly preferably form a common component. This preferred component is described in more detail in the figures.

In an alternative embodiment the frequency-dependent valve is disposed on the stroke-dependent piston. The frequency-dependent valve thus does not have to be mandatorily integrated in the stroke-dependent piston. It is likewise possible for the frequency-dependent valve (when viewed along the piston longitudinal axis) to be disposed directly above or below the stroke-dependent piston and to be contiguous to this piston, for example.

The preferred functional mode and the preferred geometric construction of the stroke-dependent piston is first to be explained herein.

It is preferable for a cup-shaped socket which by way of the closed end thereof bears at least approximately on the cylinder base, or is installed so as to be oriented in the direction of the cylinder base, respectively, to be disposed on the lower end of the cylinder tube (thus in the installed state of the shock absorber, when viewed in the vehicle vertical direction). The open end of the socket in this instance is oriented at least approximately in the direction of the upper end of the cylinder tube such that the stroke-dependent piston can plunge into this open end.

The external diameter of the cup-shaped socket herein is intentionally smaller than the internal diameter of the cylinder tube. The external diameter of the socket is preferably chosen to be that much smaller than the internal diameter of the cylinder tube that a radial gap which enables a flow of fluid to the cylinder tube base is created between the cylinder tube and the socket.

As has already been mentioned above, it is furthermore preferable that the shock absorber represents a telescopic twin-tube damper having an internal and an external cylinder tube. The two cylinder tubes are fluidically connected to one another by way of a base valve at the lowermost end of the internal cylinder tube. A fluid connection between the lower working chamber and the base valve herein is preferably represented by way of a plurality of ducts, for example. This invention is primarily focused on discussing the internal cylinder tube, which is why the term "cylinder tube" per se refers to the internal cylinder tube (should this be a twin-tube damper).

The cup-shaped socket herein is disposed so as to bear on the cylinder base, or on the base valve of the damper, respectively.

The internal diameter of the shell face of the socket herein is preferably selected so as to be of equal size as the diameter of the stroke-dependent piston. On account thereof, the stroke-dependent piston acts in a relevant manner only once the latter in terms of the plunging level thereof, or in terms of the plunging depth thereof, has reached the socket.

Since the socket from the depth level is preferably located at the lower end, for example in the lower third of the cylinder tube length, the stroke-dependent piston acts only upon reaching a specific stroke of the shock absorber, or of the wheel of the vehicle, respectively.

When the wheel of the vehicle, or the shock absorber, respectively, thus reaches the required plunging depth as from where the socket is disposed, and when the stroke-dependent piston moves into the socket, the damping force in this range is increased in an adjustable manner. Said adjustment herein takes place, for example, by a defined bypass flow control avoiding the stroke-dependent piston, or through the latter. Said socket enables an additional working chamber in which an additional progressive damping force can be generated to be configured or constructed, respectively.

In the case of comparatively small damper strokes (which thus do not reach the mentioned plunging depth as from which the socket is disposed), the stroke-dependent piston and the primary piston are moved in the conventional cylinder tube. Since the diameter of the stroke-dependent piston is significantly smaller than that of the cylinder tube, the operating flow of fluids through a radial gap between the cylinder tube and the stroke-dependent piston, wherein only minor additional damping, or almost no additional damping, respectively, is generated. The primary damping force at this location is instead generated by the primary piston.

In contrast, in the case of large damper strokes, thus when the stroke is so large that the stroke-dependent piston plunges into the socket, the stroke-dependent piston in this range, conjointly with the socket, in this instance acts as an additional compression chamber. The displaced operating fluid is in this instance preferably compressed between the stroke-dependent piston and the closed base of the socket. The deeper the stroke-dependent piston thus penetrates the socket (thus the greater the damper stroke), the stronger the compression of the fluid and the higher the resistance created on account thereof and thus the damping.

It is possible herein for the mentioned additional stroke-dependent damping to be implemented by bypass ducts through the stroke-dependent piston, for example.

In order to avoid an abrupt transition from (primary) damping by the primary piston to damping by the stroke-dependent piston, or in order to design the transition so as to be smoother, respectively, it is provided in a preferred variant of the invention alternatively or additionally to the mentioned bypasses, respectively, that the cup-shaped socket, at least on the internal shell face thereof, has an axially extending conical groove, or a conical depression, respectively. Such a conical groove, or preferably a plurality of such conical grooves which are distributed radially across the shell internal face of the socket, respectively, herein from the socket entry preferably extend in the axial direction in the direction of the socket base and herein narrow in a conical manner. The mentioned resistance can advantageously be controlled in this way, depending on the configuration and the length of the grooves.

The grooves, or the groove, respectively, particularly preferably do/does not extend up to the end of the socket base but terminate/terminates already a few centimeters ahead of the socket base such that a final very high spring force is achieved purely by compressing the operating fluid at a very high damper stroke (thus when said last centimeters of the socket have been reached by the stroke-dependent piston).

In one further advantageous design embodiment of the invention, the stroke-dependent piston comprises an annular seal which determines the external diameter of the stroke-dependent piston. The annular seal herein preferably also has the same external diameter as the internal shell face of the socket. This enables functioning or acting, respectively, of the stroke-dependent piston in a compression stage of the shock absorber. The action in a compression stage of the shock absorber in this context thus means that the stroke-dependent damping is implemented only when the telescopic damper is compressed, or when the piston rod is in a downward movement in the direction of the cylinder base, respectively.

For example, when the stroke-dependent piston in such a compression stage of the damper plunges into the socket configured with the mentioned conical grooves, the flow of fluid from the lower additional working chamber of the socket into the "lower working chamber" of the cylinder tube (the latter being formed by the primary piston) thus takes place through the conical grooves in a manner passing the annular seal in a radial manner. On account of the grooves being configured conically and thus narrowing in the axial direction in the direction of the socket base until the grooves are no longer present, the damping likewise increases as the stroke of the damper increases.

The stroke-dependent piston herein furthermore preferably comprises through bores through which the operating fluid in a tension stage of the damper can flow from the "lower working chamber" of the cylinder tube (thus the working chamber which is formed by the primary piston) back into the socket, or the additional working chamber which is formed by the stroke-dependent piston in the socket.

It is furthermore preferably provided that the stroke-dependent piston no longer acts in such a tension stage, the frequency-dependent valve being able to act instead.

As is known, the situation of the telescopic shock absorber in which the piston rod is displaced out of the cylinder tube again (quasi along the cylinder longitudinal axis and at least approximately in the vehicle vertical direction, thus away from the cylinder base) is referred to as the tension stage.

In terms of the mentioned invention it is however always particularly preferable and advantageous that frequency-dependent damping is enabled in a tension stage (and stroke-dependent damping is enabled in the compression stage). It is furthermore preferable and advantageous herein that this dependency of the damping in the two stages can be implemented by way of a common component, specifically the stroke-dependent piston, in each case by different movement variables of the vehicle (thus once by the frequency and once by the piston stroke).

Alternatively, it is possible that this dependency of the damping in the two stages can be implemented by way of a combined component composed of the stroke-dependent piston and the frequency-dependent or frequency-selective valve, respectively, in each case by different movement variables of the vehicle (thus once by the frequency and once by the piston stroke).

The frequency-dependent damping herein is preferably implemented in such a manner that a frequency-dependent, or a frequency-selective, respectively, valve (also known as a FSD valve) is integrated in the stroke-dependent piston.

As has already been mentioned above, it is alternatively also possible for the frequency-dependent valve to be disposed on the stroke-dependent piston (as opposed to be integrated in the latter).

It is furthermore preferable for a bypass through the piston rod and the extension thereof directly into the interior of the stroke-dependent piston to be provided, said bypass leading to the frequency-dependent valve. The bypass herein is preferably disposed at a position above the primary piston in the piston rod such that the operating fluid from the upper into the lower working chamber is directed through the piston rod directly to the frequency-dependent valve.

In order for a frequency-dependent or frequency-selective, respectively, valve which is integrated in the stroke-dependent piston to be implemented, or in order for frequency-dependent damping to be implemented, respectively, the stroke-dependent piston preferably has an extra volume which is disposed in the interior of the stroke-dependent piston and which by way of a constricted inlet duct is connected to the mentioned bypass in the piston rod. The stroke-dependent piston furthermore preferably comprises an intervening deformable diaphragm which mutually separates the bypass volume and the extra volume, as well as a plurality of outlet ducts which fluidically connect the bypass and the lower working chamber of the damper to one another, and a flat disk which in the non-stressed state (thus in a compression stage of the damper) closes the outlet ducts. A configuration of this type of the frequency-dependent or frequency-selective, respectively, valve in the stroke-dependent piston is once again visualized in the figures. The frequency-dependent or frequency-selective, respectively, valve thus preferably acts when the shock absorber is in a tension stage.

For example, when the piston assembly moves axially away from the cylinder base at a low frequency of movement, an almost approximately constant quantity of operating fluid thus flows from the upper working chamber into the bypass. Pressure is thus prevalent on the inlet duct and on the flat disk over a comparatively long time. This prevailing pressure leads to the operating fluid which is located in the bypass flowing through the inlet duct into the extra volume under the diaphragm. The operating fluid accumulating there generates a specific pressure in the extra volume, this pressure leading to a specific damping force. This force herein is configured in such a manner that said force pushes the diaphragm upward, on account of which the flat disk is also pushed or pressed upward, respectively. The outlet ducts are closed. On account thereof, an outflow of the operating fluid from the extra volume of the frequency-dependent or frequency-selective, respectively, valve is prevented. The damping force is not reduced.

When the frequency of movement of the lifting piston, or of the primary piston, respectively, increases (in a tension stage), for example on account of travel of the vehicle on a rough carriageway, abrupt flows of the operating fluid through the bypass are thus created. These abrupt flows generate likewise abrupt pressure variations which act on the flat disk, the diaphragm, and the inlet duct. No operating fluid can accumulate in the extra volume by virtue of the intense pressure variations at the inlet duct. The pressure variations prevalent on the flat disk lead to a deformation of the flat disk in the direction of the extra volume. The outlet ducts are opened on account of this deformation. The fluid in this instance flows from the stroke-dependent piston (in which the extra volume is located) into the lower working chamber. The damping force is reduced.

The stroke-dependent piston which comprises the mentioned frequency-dependent or frequency-selective, respectively, valve and forms the stroke-dependent valve, at the lower end herein is preferably linked to an extension of the piston rod. The stroke-dependent piston can be screw-fitted to the end of the extension of the piston rod, for example. To this end, it is preferable for the lower end of the extension of the piston rod to possess a thread to which the stroke-dependent piston can be screw-fitted.

The invention shows the configuration of a shock absorber which by adding only one stroke-dependent piston enables stroke-dependent as well as frequency-dependent damping, said damping being implemented in a common component. This integration of two functions in a single component saves costs as well as installation space.

These and further features emerge not only from the claims and from the description but also from the drawings, wherein the individual features may be realized in each case individually or severally in the form of sub-combinations in an embodiment of the invention and can form advantageous, independently patentable embodiments, for which protection is hereby claimed.

The invention will be explained further hereunder by means of an exemplary embodiment. All of the features described in more detail herein may be relevant to the invention.

DETAILED DESCRIPTION OF THE DRAWINGS

Figure 1:
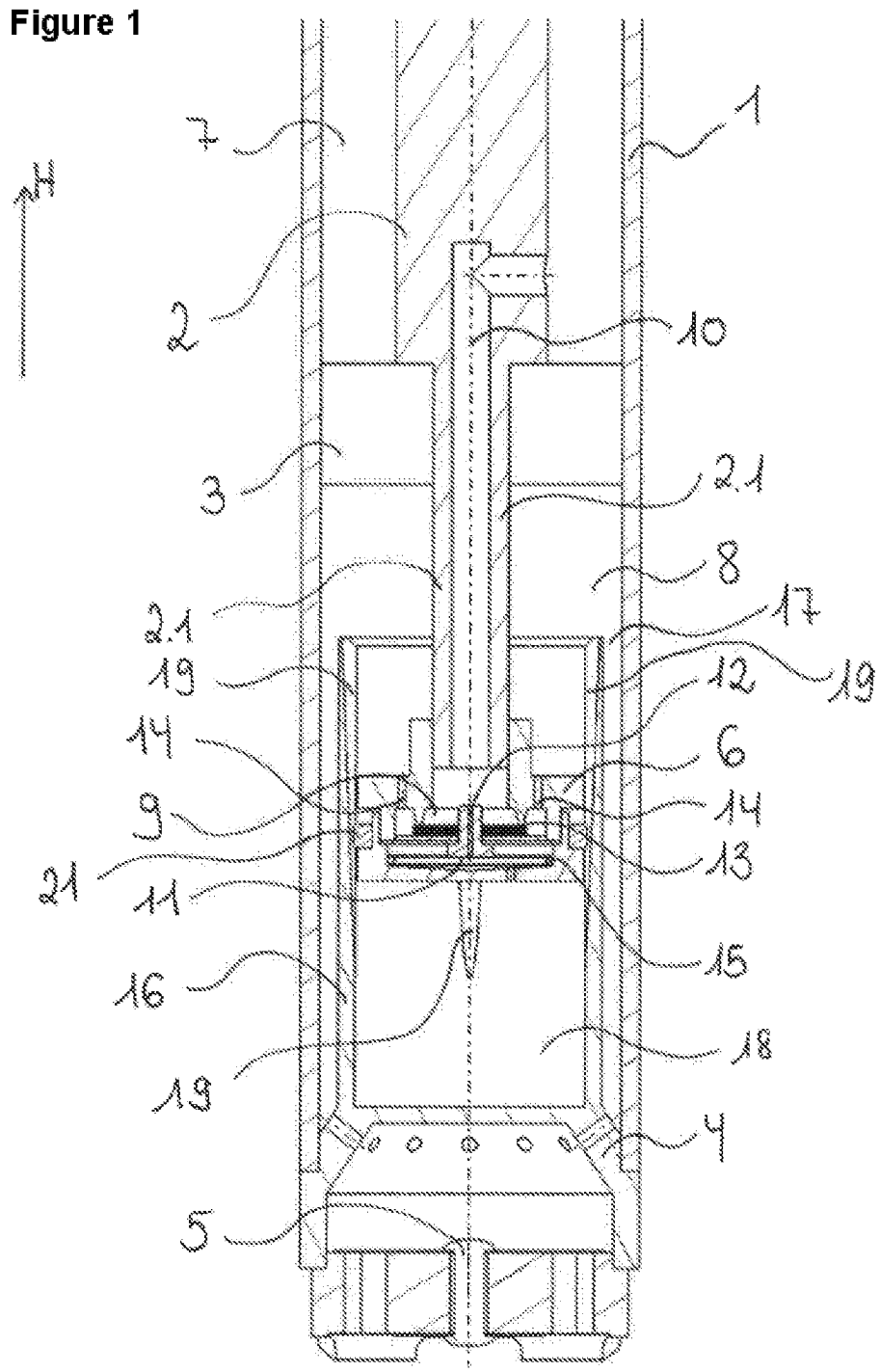
FIG. 1, in a schematic manner, shows a longitudinal section through a cylinder tube of a shock absorber of a vehicle, having a stroke-dependent piston according to an embodiment of the invention.

A sectional view through the longitudinal axis of an exemplary fluid-filled cylinder tube 1 of a shock absorber of a vehicle is schematically shown in FIG. 1. The cylinder tube 1 in FIG. 1 herein is oriented so as to be at least approximately in the installed state thereof in the vehicle, specifically at least approximately in the vehicle vertical direction H.

A piston assembly which is movable axially up and down in relation to the cylinder tube 1 is disposed in the interior of the cylinder tube 1, said piston assembly having a piston 3 (also referred to as the primary piston) which is likewise able to slide axially in the cylinder tube 1 and which is fixedly connected to a piston rod 2 which is movable axially in the cylinder tube 1. An operating fluid is located in the cylinder tube 1.

A base valve 5 which enables a flow of fluid between the cylinder tube 1 and the exterior of the cylinder tube 1 (such as in a twin-tube damper, for example) is disposed on the cylinder base 4.

The diameter of the primary piston 3 herein corresponds to the diameter of the internal shell face of the cylinder tube 1, on account of which the primary piston 3 forms an upper working chamber 7 and a lower working chamber 8. On account of suitable bypasses or through bores, respectively, (not illustrated) through the primary piston 3, a flow of fluid from the upper working chamber 7 into the lower working chamber 8 can be achieved, and damping can be achieved on account of specific variations of the cross sections of the bypasses, as is already known from the prior art.

In one preferred embodiment of the invention, this however not being depicted in this example, the cylinder tube 1 is surrounded by a further cylinder tube, wherein the shock absorber in this instance represents a so-called twin-tube shock absorber.

A further piston 6, here referred to as the stroke-dependent piston 6, is disposed at the lower end of an extension 2.1 of the piston rod 2, the stroke-dependent piston 6 sliding axially in the cylinder tube 1 having the extension 2.1. The stroke-dependent piston 6 herein is screw-fitted to the extension 2.1 of the piston rod. To this end, the extension 2.1 of the piston rod 2 on the lower end thereof preferably has a thread (not shown) on which the stroke-dependent piston 6 is screwed in and thus fastened.

With the aid of this stroke-dependent piston 6, additional damping in the compression stage and frequency-dependent or frequency-selective, respectively, controlling or adjusting, respectively, of the damping are to be implemented as a function of the piston stroke and of the vibration frequency, or the frequency of the movement, respectively, of the damper in the tension stage of the shock absorber.

These additional damping actions, or this frequency-dependent or frequency-selective, respectively, controlling, respectively, herein is in each case possible in different operating situations or (operating) stages, respectively, of the shock absorber. The stroke-dependent damping herein can be implemented in a compression stage of the damper, and the frequency-dependent, or frequency-selective, respectively, damping herein can be implemented in a tension stage of the damper.

The damper in this instance is in a compression stage when the piston assembly 2, 3 moves in the direction of the cylinder base 4 and thus pushes downward. The telescopic shock absorber herein is displaced so as to axially inherently compress and the operating fluid flows from the lower working chamber 8 into the upper working chamber 7.

In contrast, the piston assembly 2, 3 in a tension stage moves away from the cylinder base 4, upward in the axial direction of the cylinder tube 1. The telescopic shock absorber is displaced so as to axially inherently expand, wherein the operating fluid flows from the upper working chamber 7 into the lower working chamber 8.

In order for the mentioned two additional functions, specifically frequency-dependent or frequency-selective, respectively, damping in a tension stage and stroke-dependent damping in a compression stage of the damper to be implemented, the stroke-dependent piston 6 is furthermore configured as follows.

In order to enable frequency-dependent or frequency-selective, respectively, damping, a frequency-dependent or frequency-selective, respectively, a valve 9 known from the prior art is disposed in the interior of the stroke-dependent piston 6, the valve 9 not being illustrated in more detail in FIG. 1.

Figure 3:
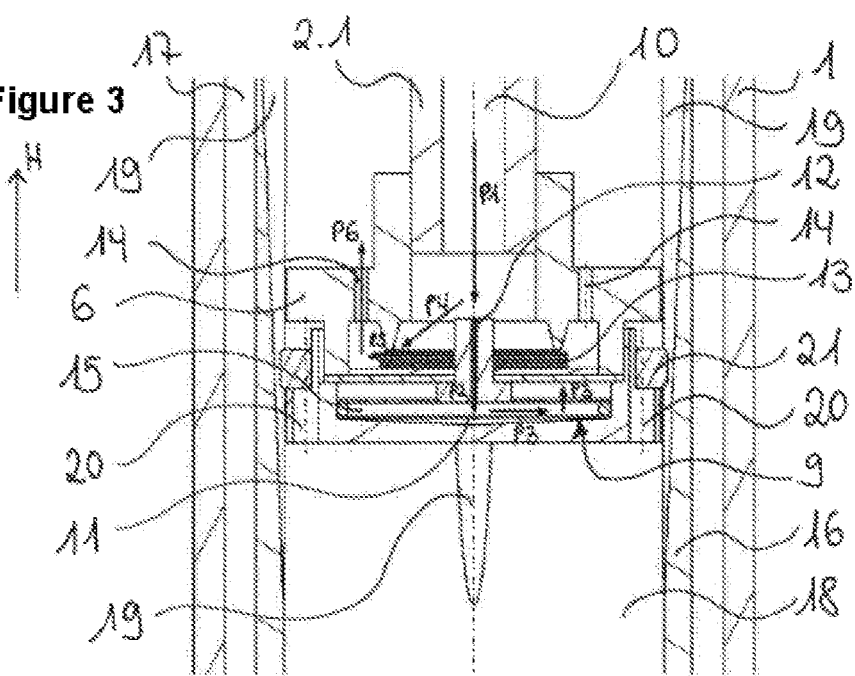

FIG. 3 describes in more detail the functional mode of this frequency-selective valve 9 by illustrating arrows along the flow direction of the fluid in a tension stage of the damper. A detailed view of the sectional view from FIG. 1 of the stroke-dependent piston 6 which has plunged into the socket 16 is shown here.

The frequency-selective valve 9 is configured such that a bypass 10 of the upper working chamber 7 into the lower working chamber 8, through the piston rod 2 and the extension 2.1 of the piston rod 2, is disposed directly into the interior of the frequency-selective valve 9.

As is illustrated in FIG. 3, the frequency-selective valve 9 comprises an extra volume 11 which, by way of a constricted inlet duct 12, is connected to the mentioned bypass 10 in the piston rod 2, 2.1. The frequency-selective valve 9 furthermore comprises an intervening deformable diaphragm 13 which mutually separates the bypass 10 and the extra volume 11, as well as a plurality of outlet ducts 14 which fluidically connect the bypass 10 and the lower working chamber 8 of the damper to one another.

The outlet ducts 14 in a non-stressed state of the frequency-selective valve 9 (thus in a compression stage of the damper, for example) are closed by a flat disk 15.

When the shock absorber is thus now in a tension stage, the shock absorber by means of the frequency-selective valve 9 is thus capable of enabling frequency-selective damping in the stroke-selective piston 6.

Figure 2:
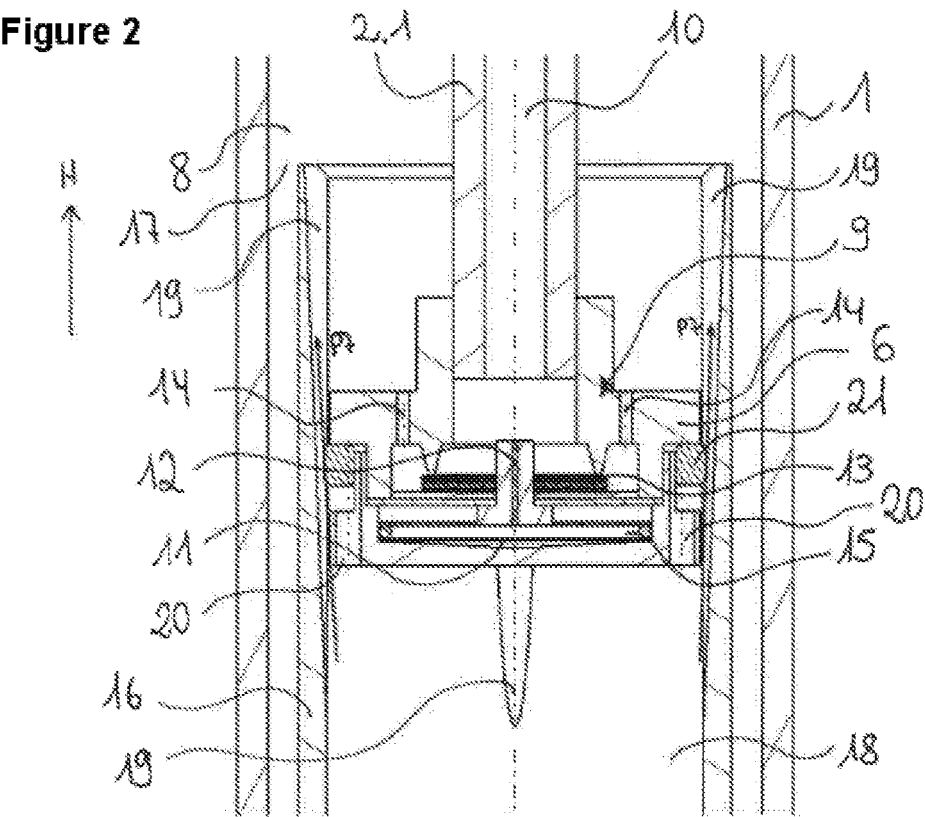
FIGS. 2 and 3 are more detailed views of the sectional view from FIG. 1, wherein the flow of fluid and the functional mode of the stroke-dependent piston are shown individually in a compression stage and in a tension stage.

This frequency-selective damping is to be explained in more detail by means of the arrow arrangement in FIG. 3. FIG. 2 and FIG. 3 herein show a detailed view of the socket 16 and the stroke-selective piston 6 in the same sectional view as in FIG. 1. The damper herein is depicted in a compression stage in FIG. 2, and in a tension stage in FIG. 3. The stroke-dependent valve of the stroke-dependent damper 6 does not act in a tension stage, while the frequency-selective valve 9 of the independent damper 6 does not act in a compression stage.

For example, when the piston assembly 2, 3 moves axially away from the cylinder base 4 at a low frequency of movement, an at least approximately constant quantity of operating fluid thus flows from the upper working chamber 7 into the bypass 10 (cf. P1). Pressure thus prevails for a comparatively long duration on the inlet duct 12 and on the flat disk 15. This prevailing pressure leads to the operating fluid which is located in the bypass 10 to flow through the inlet duct 12 into the extra volume 11 below the diaphragm 13 (cf. P2). The operating fluid accumulating there generates a specific pressure in the extra volume 11, this specific pressure leading to a specific force acting on the diaphragm 13 (cf. P3). This force herein is configured in such a manner that the force pushes the diaphragm 13 upward, on account of which the flat disk 15 is also pushed or pressed upward, respectively. The outlet ducts 14 are closed. On account thereof, an outflow of the operating fluid from the extra volume 11 of the frequency-selective valve 9 is prevented. The damping force is not reduced.

When the frequency of movement of the lifting piston, or of the primary piston 3, respectively, increases (in a tension stage), for example on account of travel of the vehicle on a rough carriageway, abrupt flows of the operating fluid through the bypass 10 are thus created (cf. P1). These abrupt flows likewise generate abrupt pressure variations which act on the flat disk 15, the diaphragm 13, and the inlet duct 12. By virtue of the intense variations and thus of the excessively fast movement of the fluid toward the inlet duct 12 which in terms of the cross section thereof is too narrow for this purpose, no fluid can flow through the inlet duct 12, and no operating fluid either can thus accumulate in the extra volume 11. The fluid is distributed on the diaphragm 13 (cf. P4). The pressure variations prevailing on the flat disk 15 lead to a deformation of this flat disk 15 in the direction of the extra volume 11. The outlet ducts 14 are opened on account of this deformation (cf. P5). The fluid in this instance flows from the stroke-dependent piston 6 (in which the extra volume 11 is located) into the lower working chamber 8 (cf. P6). The damping force is reduced.

Besides the just described frequency-dependent or frequency-selective, respectively, damping function the stroke-dependent piston 6 moreover enables a stroke-dependent damper function of the shock absorber in a compression stage. To this end, a cup-shaped socket 16 at the lower end of the cylinder tube 1 is disposed so as to be coaxial with the cylinder tube 1 and so as to bear on the cylinder base 4. The closed end of the socket 16 herein bears on the cylinder base 4. The diameter of the external shell face of the socket 16 herein is significantly smaller than the diameter of the internal shell face of the cylinder tube 1, on account of which a radial gap 17 which permits a flow of fluid between the base valve 5 and the cylinder tube 1 is formed between the socket 16 and the cylinder tube 1.

The diameter of the internal shell face of the socket 16 herein corresponds exactly to the external diameter of the stroke-dependent piston 6, the latter as from a specific damper stroke (thus in a compression stage) plunging into the socket 16. The external diameter of the stroke-dependent piston 6 herein is determined by an annular seal 21 which is capable of bearing in a sealing manner on the internal shell face of the socket 16.

On account of the stroke-dependent piston 6 plunging into the socket 16 at a specific damper stroke which is predefined by the height or the position, respectively, of the socket within the cylinder tube 1, an extra chamber 18 is formed in which operating fluid is compressed in a compression stage (upon reaching the specific damper stroke).

In order for suitable stroke-dependent damping to be achieved, bypasses may be disposed in the stroke-dependent piston 6, said bypasses according to the principle of the primary piston 3 causing or initiating damping, respectively.

As can in particular be seen in FIG. 1, it is alternatively or else additionally possible for the socket 16 on the internal shell face to be provided with one or a plurality of conically running grooves 19. These grooves 19 are distributed radially across the shell face of the socket 16 and disposed in the axial direction of the socket 16, and when viewed in the direction of the socket base, run in a tapered or conical manner, respectively.

As can likewise be readily seen in FIG. 1, it is furthermore possible for the grooves not to run up to the base of the socket 16 but to already terminate ahead of said base.

Such a conical configuration of the grooves has the advantage that damping is not abrupt in manner on account of the abrupt diameter difference between the socket 16 and the cylinder tube 1, but that a gradual transition, or increased damping associated with the continuing damper stroke, respectively, takes place. The damping is thus more or increased as the stroke increases, or as the stroke-dependent piston 6 plunges further into the socket 16, respectively, until the operating fluid in the region without grooves 19 is simply increasingly compressed.

In order for the operating fluid during a tension stage of the damper to be able to flow from the lower working chamber 8 into the extra chamber 18, through bores 20 are provided in the stroke-dependent piston 6.

The functional mode of the stroke-dependent damping is to be explained in more detail hereunder by means of FIG. 2. In a compression stage of the damper, thus when the piston assembly 2, 3 moves axially in the direction of the cylinder base 4, operating fluid from the lower working chamber 8 first flows through the bypasses or valves, respectively, of the primary piston 3 into the upper working chamber 7. The damping in this instance at least is largely handled by the properties of the primary piston 3. The stroke-dependent piston 6 at this point participates in damping only to a negligible extent since the operating fluid flows laterally through the radial gap which is created on account of the difference in the diameter of the stroke-dependent piston 6 and that of the cylinder tube 1.

However, when the stroke-dependent piston 6 reaches the socket 16, the damper stroke thus having progressed in such a manner that the socket 16 has been reached, the stroke-dependent piston 6 thus handles a large share of the damping. As is illustrated in FIG. 2, the operating fluid in this instance flows through the grooves 19, passing the stroke-independent piston 6, or the annular seal 21, respectively, in a radially external manner.

By virtue of the conical shape of the grooves 19, the flow cross section decreases as the stroke increases, or as the stroke-dependent piston 6 increasingly plunges into the socket 16, and the damping force is thus increased.

Upon reaching the end of the grooves 19, no more operating fluid can flow from the extra chamber 18 into the lower working chamber 8. The operating fluid as from this stroke, or as from this point in time, respectively, is simply increasingly compressed as the stroke increases.

When the damper is then again in a compression stage, the operating fluid thus flows by way of the bypasses, or the through bores 20 of the stroke-dependent piston 6, respectively, into the extra chamber 18, as can be seen by the arrows in FIG. 3.

LIST OF REFERENCE SIGNS

1 Cylinder tube
2 Piston rod
2.1 Extension of the piston rod
3 Primary piston
4 Cylinder base
5 Base valve
6 Stroke-dependent pistons
7 Upper working chamber
8 Lower working chamber
9 Frequency-selective valves
10 Bypass
11 Extra volume
12 Inlet duct
13 Diaphragm
14 Outlet duct
15 Flat disk
16 Socket
17 Gap
18 Extra chamber
19 Groove
20 Through bore
21 Annular seal
H Vehicle vertical direction
P1 Arrow 1
P2 Arrow 2
P3 Arrow 3
P4 Arrow 4
P5 Arrow 5
P6 Arrow 6
P7 Arrow 7

What is claimed is:
1. A vibration damper for a vehicle, comprising:
at least one cylinder tube which forms a fluid chamber; and
a piston assembly disposed in the cylinder tube so as to slide axially and divide the cylinder tube into two working chambers, an upper and a lower working chamber;
wherein the piston assembly comprises an axially displaceable primary piston which is axially established on a piston rod that is movable axially relative to the cylinder tube, and a piston valve which influences the flow of fluid between the upper working chamber and the lower working chamber, wherein a stroke-dependent piston which acts upon reaching a specific damper stroke is disposed in an axial extension of the piston rod in the direction of a cylinder base of the cylinder tube, wherein the stroke-dependent piston has a smaller diameter than the primary piston and only operates when plunging into a smaller diameter of a cylinder-internal shell face, on account of which a stroke-dependent valve of the stroke-dependent piston is formed, and wherein a damping action of the stroke-dependent valve takes place as a function of a plunging depth of the stroke-dependent piston into the cylinder tube, wherein the stroke-dependent piston comprises a frequency-dependent valve in addition to the stroke-dependent valve, wherein the frequency-dependent valve is disposed so as to be coaxial with the stroke-dependent piston and is disposed in an interior of the stroke-dependent piston, wherein the piston rod at a position in the upper working chamber comprises a bypass for flow of fluid from the upper working chamber into the lower working chamber, and the flow is through the piston rod and the extension of the piston rod directly into the frequency-dependent valve which is disposed in the interior of the stroke-dependent piston.

2. The vibration damper according to claim 1, wherein a cup-shaped socket is disposed on a lower end of the cylinder tube so as to be coaxial with the latter, an external diameter of the socket is smaller than an internal diameter of the cylinder tube, and the stroke-dependent piston upon reaching a specific damper stroke plunges into the socket and is active.

3. The vibration damper according to claim 2, wherein the vibration damper is a twin-tube damper having an internal and an external cylinder tube, and the cup-shaped socket is disposed within the internal cylinder tube.

4. The vibration damper according to claim 2, wherein the cup-shaped socket, at least on an internal shell face, has an axially extending conical groove which from a socket entry runs axially in the direction of a socket base and narrows in a conical manner.

5. The vibration damper according to claim 4, wherein the at least one groove does not extend up to the socket base.

6. The vibration damper according to claim 2, wherein the stroke-dependent piston comprises an annular seal, and the annular seal has a same diameter as an internal shell face of the socket.

7. The vibration damper according to claim 1, wherein the stroke-dependent piston comprises at least one through bore for flow of fluid from the upper working chamber into the lower working chamber in a tension stage of the vibration damper.

8. The vibration damper according to claim 1, wherein the stroke-dependent valve acts in a compression stage of the vibration damper, and the frequency-dependent valve acts in a tension stage of the vibration damper.

* * * * *